United States Patent [19]

Hillestad et al.

[11] Patent Number: 5,033,347
[45] Date of Patent: Jul. 23, 1991

[54] BOILER TUBE CUTTING APPARATUS

[76] Inventors: Tollief O. Hillestad, 108 9th Ave.,, W. Summerland Key, Fla. 33042; Mark W. Hillestad, 220 Hatch Rd., Wadsworth, Ohio 44281

[21] Appl. No.: 526,892

[22] Filed: May 22, 1990

Related U.S. Application Data

[63] Continuation of Ser. No. 398,625, Aug. 25, 1989, abandoned.

[51] Int. Cl.$^5$ .......................... B23D 45/12; B23P 6/00
[52] U.S. Cl. .................. 83/487; 29/890.031; 29/402.08; 83/745
[58] Field of Search ................... 83/483–485, 83/487–489, 743, 745, 930; 29/157.4, 402.8, 402.9, 402.11, 890.031

[56] References Cited

U.S. PATENT DOCUMENTS

| | | | |
|---|---|---|---|
| 3,323,507 | 6/1967 | Schuman | 125/14 |
| 3,504,715 | 4/1970 | Miles | 83/489 |
| 3,722,497 | 3/1973 | Heistand | 125/14 |
| 3,763,845 | 10/1973 | Hiestand et al. | 125/14 |
| 4,054,179 | 10/1977 | Destree | 125/14 X |
| 4,338,051 | 7/1982 | Garver et al. | 83/488 X |
| 4,549,455 | 10/1985 | Perilloux, Jr. | 83/488 X |
| 4,576,076 | 3/1986 | Pyle | 83/488 X |
| 4,599,774 | 7/1986 | Till, Jr. | 29/157.4 |
| 4,633,555 | 1/1987 | Legge | 83/54 X |
| 4,718,201 | 1/1988 | Legge | 83/54 X |
| 4,739,688 | 4/1988 | Brennan et al. | 83/490 X |
| 4,830,551 | 5/1989 | Brennane et al. | 29/157.4 X |
| 4,836,494 | 6/1989 | Johnson | 125/14 X |
| 4,909,114 | 3/1990 | Astle | 83/745 |

FOREIGN PATENT DOCUMENTS 407735 12/1924 Fed. Rep. of Germany .

Primary Examiner—Mark Rosenbaum
Assistant Examiner—Kenneth E. Peterson
Attorney, Agent, or Firm—Daniel J. Hudak Co.

[57] ABSTRACT

An apparatus for cutting boiler tubes comprising a movable carriage having a cutting means where the carriage and cutting means are supported on a lateral supporting beam secured adjacently to a bank of boiler tubes. The movable carriage means is stabilized with a plurality of bearings means for engaging the lateral beam and preventing strain and vibrations during the cutting process. The cutting means is preferably powered by a pneumatic motor.

52 Claims, 4 Drawing Sheets

BOILER TUBE CUTTING APPARATUS

CROSS-REFERENCE

This application is a continuation of application Ser. No. 07/398,625, filed Aug. 25, 1989, for "Boiler Tube Cutting Apparatus," by Tollief O. Hillestad and Mark W. Hillestad, now abandoned.

FIELD OF THE INVENTION

The present invention relates to a boiler tube cutting apparatus operative to progressively and adjacently move in a linear direction as at a transverse angle to a bank of parallel boiler tubes while cutting the same.

BACKGROUND OF THE INVENTION

Industrial plants, such as power stations, utilize large quantities of steam generated in boiler systems known as steam generators. Typically banks of vertically disposed parallel boiler tubes are arranged inside a heated chamber where hot water, steam, or mixtures thereof pass through the boiler tubes. Due to constant use, the boiler tubes become rusted, worn, deteriorated, etc., and otherwise fail thus necessitating frequent replacement of the boiler tubes. Such boiler tubes must be removed and ordinarily an entire bank of boiler tubes are cut from their mountings with a carbide saw or abrasive disk. However, the cutting blades or disks fail quite rapidly due to the heavy cutting load as well as highly undesirable load strains, vibrations, bending moments, etc., generated during the cutting process. In the past, boiler tubes were cut by cutting wheels or blades driven by electrical or hydraulic motors, but hydraulic motors are generally inadequate due to dirty environments, e.g. dust, dirt, etc., which foul the motor and cause the same to break down while electric motors generally fail due to coil and/or armature burnout. Supporting mechanisms for holding the motor activated cutting devices lacked rigidity and created highly undesirable strains, vibrations, etc., such as undue flexing thereby causing rapid destruction of the cutting blade or disk. That is, due to free play, slop, lack of rigidity, etc. of the prior art devices, the cutting disk did not rotate within a plane since the portion cutting the tubes undergoes rapid flexing which causes damage and ruin of the cutting disk. In practice, the cutting saw or disk would fracture or otherwise fail after cutting only four or five boiler tubes, which resulted in a costly and very time consuming process.

SUMMARY OF THE INVENTION

It now has been found that a boiler tube cutting apparatus can be effectively stabilized against strains, etc., by mounting a cutting means on a movable carriage adapted to move linearly at a controlled rate on a lateral support beam secured adjacently to the bank of boiler tubes. The movable carriage is stabilized against vertical and transverse vibrations by bearing means securely engaging the lateral support beam while the cutting means cuts the boiler tubes at a desired angle such as a right angle to the axial direction of the boiler tubes. Stabilizing the movable carriage relative to the lateral support beam effectively eliminates undesirable strain and vibration, and the like, from being generated in the cutting means which in turn substantially prolongs the useful life of the cutting wheel or disk since it rotates in a plane free of flexing, strain, etc. In contrast to the prior art device to fail after cutting only four or five boiler tubes, the boiler tube cutting apparatus of this invention can effectively cut numerous, e.g., more than 60 boiler tubes without failure of the cutting wheel or disk. Efficiency is substantially increased due to negligible down-time to replace broken cutting wheels or disks while equipment costs are reduced considerably since fewer cutting wheels or disks are required.

The boiler tube cutting apparatus of the present invention comprises a movable cutting means operative to move in a lateral direction and adjacent to a bank of parallel boiler tubes where the cutting means is stabilized against undesirable strain while cutting the boiler tubes at an angle generally transverse to the axial direction of the boiler tubes. The cutting means is supported by a movable carriage supported by a lateral support beam secured adjacent to the bank of boiler tubes. Lateral movement of the carriage is preferably controlled by a rack and pinion gear means operative to advance the carriage along the lateral supporting beam while the carriage securely and positively tracks the supporting beam whereby the carriage and cutting means is stabilized against undesirable strain, vibration, etc. The preferred power for operating the cutting means is a pneumatic motor.

These and other advantages of the present invention will become more apparent by referring to the drawings and the detailed description of the invention.

DETAILED DESCRIPTION OF THE INVENTION

Figure 1:
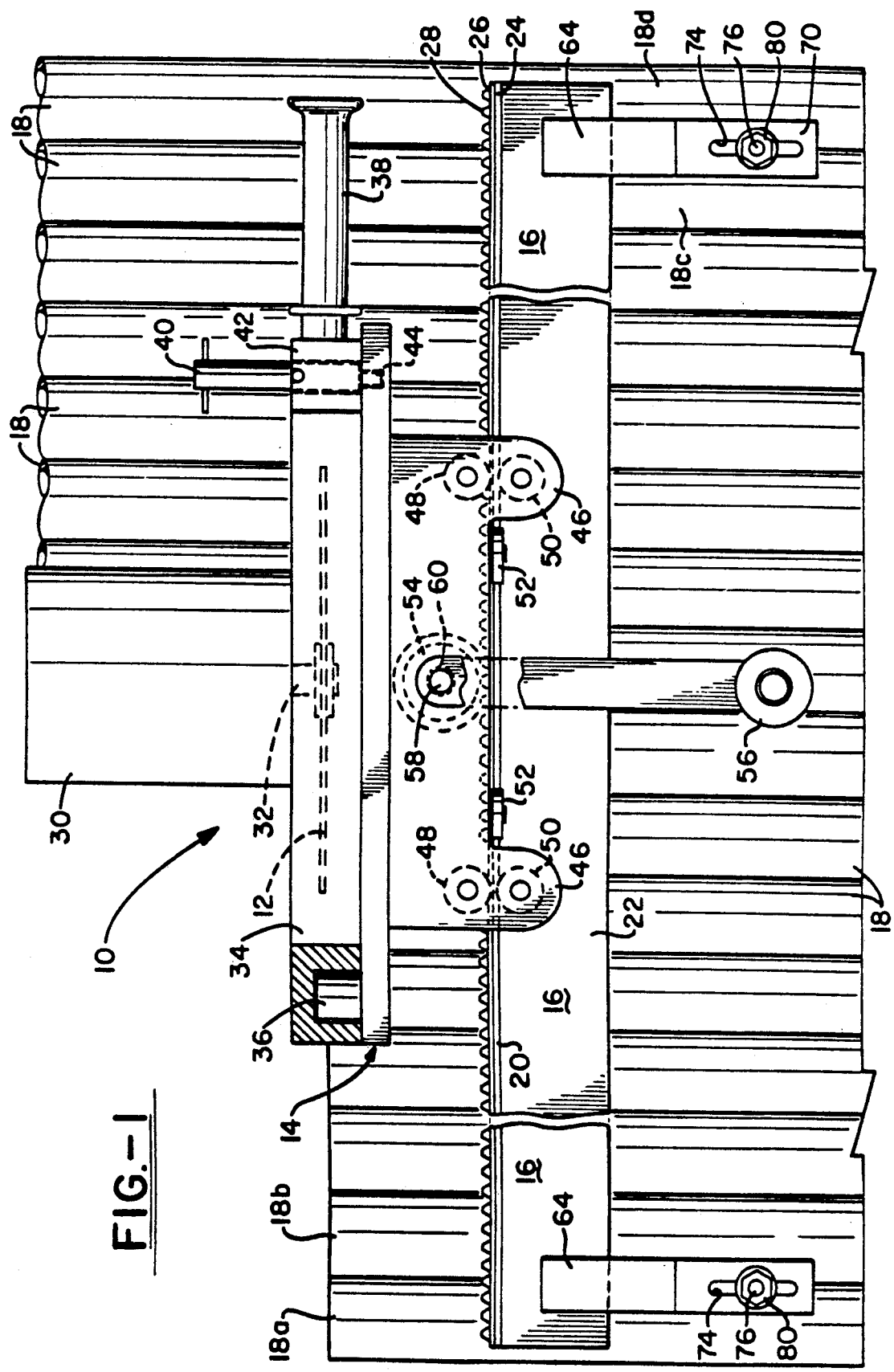
FIG. 1 is a front elevational view of the boiler tube cutting apparatus of the present invention secured adjacently to a bank of boiler tubes for cutting of the vertical boiler tubes.

Referring to the drawings, a boiler tube cutting apparatus generally indicated by the numeral 10 comprises a power activated cutting means 12 mounted on a movable carriage generally indicated by the number 14 adapted to move laterally and track a lateral supporting beam 16 secured adjacently to a bank of boiler tubes 18.

Referring first to the lateral supporting beam 16, the beam 16 is generally secured in front of and adjacent to the bank of boiler tubes 18 by welding or otherwise securing beam 16 to a pair of distal end boiler tubes 18a, 18b, and 18c, 18d, as shown in FIG. 1, or by securing to a surrounding support structure located adjacent to the bank of boiler tubes 18. The lateral support beam 16 preferably comprises a T-shape cross-section having an upper longitudinal flat flange plate 20 integral or secured to a centered downwardly extending vertical support 22. The upper flange 20 comprises an upper flat surface and a lower flat surface which define intervening front and rear lateral side edges 24, of flange 20 in the elongated dimension of beam 16. Secured to the upper surface of upper flange 20 is a centered linear rack gear 26 containing raised spaced rack teeth 28. The lateral support beam 16 is adapted to support movable carriage 14 and cutting means 12 in accordance with this invention as hereinafter described.

Figure 2:
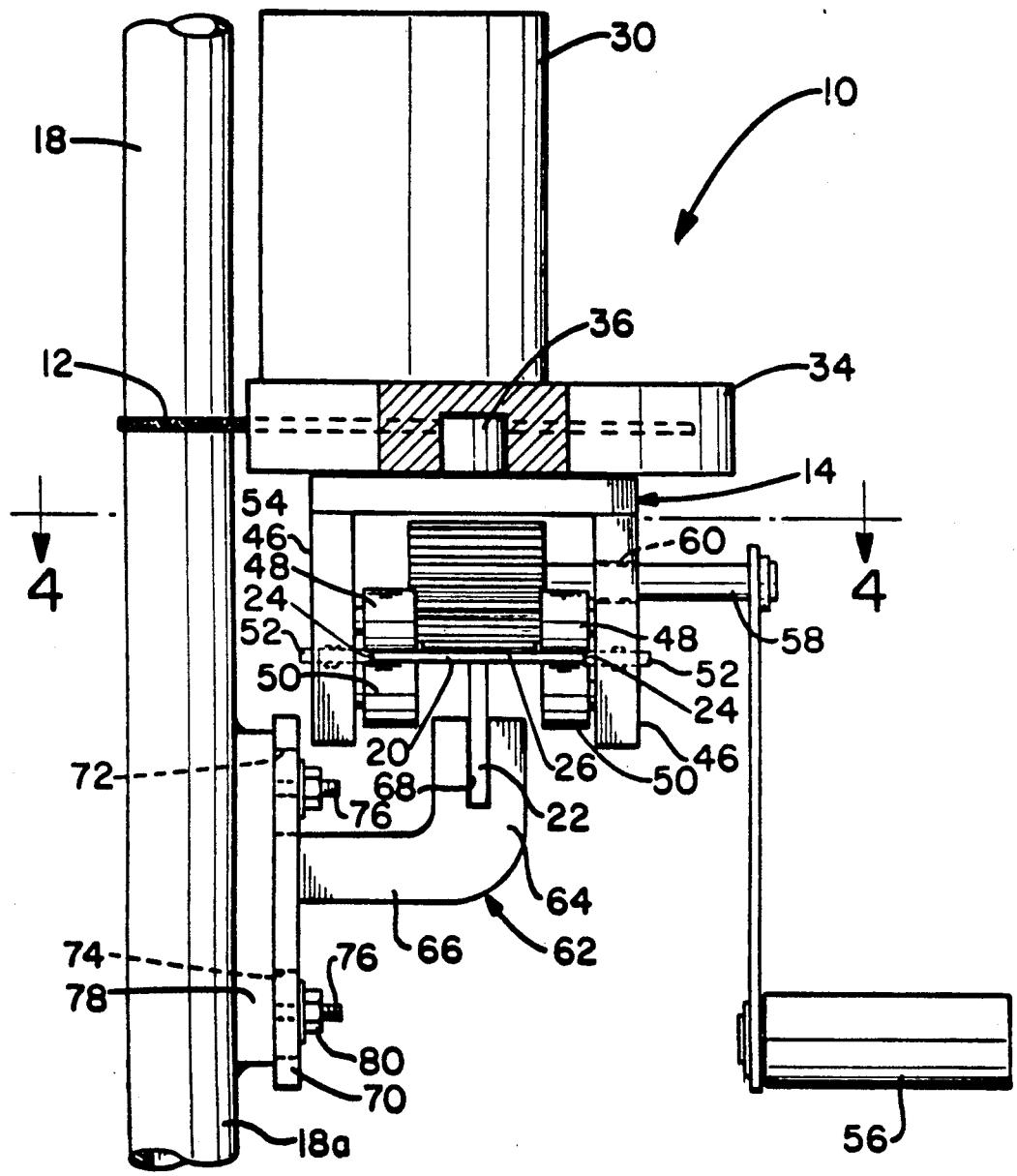
FIG. 2 is a side elevational view of the boiler tube cutting apparatus shown in FIG. 1.
Figure 3:
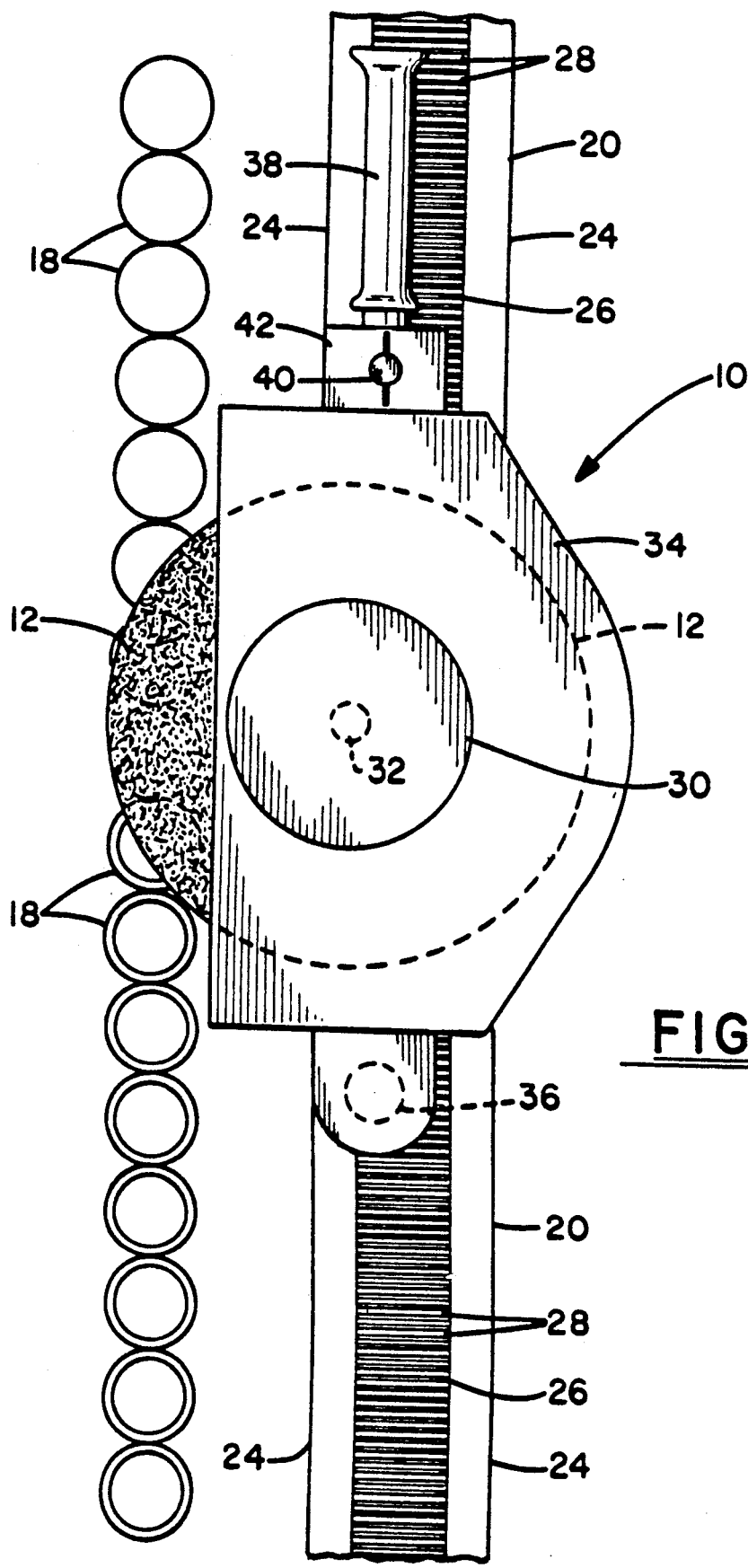
FIG. 3 is a top plan view of the boiler tube cutting apparatus of FIG. 1 and shown in the operational mode of cutting boiler tubes.

The cutting means 12 is operatively actuated by a power source such as motor 30 to drive cutting means 12 secured to the distal end of an interconnecting depending drive shaft 32. The preferred motor 30 is a pneumatic motor typically comprising a multiple vane air driven motor and powered by compressed air ordinarily available in industrial plants. A satisfactory pneumatic motor for use in the present invention generates about 3 to about 7 and desirably from about 4.5 to about 5.5 horsepower and about 3,500 to about 6,500 and desirably from about 4,500 to about 5,500 RPM at a standard factory air pressure of about 90 psi. The pneumatic motor 30 is supported by a horizontally disposed, rotatable arm 34 pivotally mounted at 36 to one end of movable carriage 14. The downwardly depending drive shaft 32 passes through an opening in rotatable support arm 34 to operate cutting means 12 in a vertically spaced relationship between supporting arm 34 and movable carriage 14, whereby cutting means 12 is located below rotatable support arm 34 surface but above movable carriage 14 to provide free operation of cutting means 12 within said space. As best seen in FIGS. 2 and 3, the rotatable arm 34 contains a lateral opening on the rear side adjacent to the bank of boiler tubes 18 to permit protrusion of the cutting means 16 beyond supporting arm 34 to cut boiler tubes 18. Rotation of supporting arm 34 about pivot 36 can be effected by handle 38 secured to the opposite end of support arm 34. Rotation of support arm 34 to the operative cutting position, best viewed in FIG. 3, can be secured in use by securing a set pin 40 through an intermediate structure 42 securing the handle 38 to the support arm 34 where set pin 40 engages a recess 44 opening located in the upper surface of the movable carriage 14. Thus, the pneumatic motor 30, rotatable supporting arm 34, and cutting means 12 can be rotated as a unit about pivot connection 36 and locked into the operative position by engaging set pin 40 within recess 44. Similarly, the unit can be reversely rotated to the non-operative position away from the bank of boiler tubes by reversing the procedure. In the preferred embodiment, the cutting means 12 is operative in the operating position to cut boiler pipes 18 at a right angle to the axial direction of the boiler pipes, although generally any angle can be utilized. The cutting means 12 can be a carbide wheel or disk or similar hard abrasive cutting wheel containing a peripheral cutting surface. Referring now in more detail to the movable carriage 14, the carriage contains a plurality of downwardly depending bearing supports 46 shown in the drawings to consist of two laterally spaced bearing supports 46 on the front side and two bearing supports 46 on the back side of the carriage 14. Operatively secured to the lower end of each bearing support 46 is an inwardly directed bearing means preferably comprising a pair of vertically spaced wheels consisting of an upper wheel 48 engaging the top surface of upper flange 20 and a lower wheel 50 engaging the lower surface of upper flange 20 of T-shape lateral supporting beam 16. Each inwardly directed bearing means or wheels 48, 50 tightly engages the upper and lower surfaces respectively of upper flange 20 of lateral support beam 16 to securely stabilize carriage 14 and cutting means 12 as a unit against vertical vibration and/or strain during the cutting operation. The movable carriage 14 further contains a plurality of downwardly depending side bearing means operatively secured to the lower front and back sides of carriage 14 where each side bearing means consists of a longitudinally mounted tracking wheel 52 adapted to securely engage lateral side edges 24 of flange 20 of lateral support beam 16. Preferably two laterally spaced side bearing wheels 52 are used on each side of carriage 14 where collectively side bearing wheels 52 transversely stabilize carriage 14 and cutting means 12 as a unit against vibration and strain transverse to lateral supporting beam 16 during the cutting operation. Thus, the vertical bearing means 48, 50 and side bearing means 52 work in concert to stabilize carriage 14 and cutting means 12 in accordance with this invention.

Lateral movement of the movable carriage 14 relative to stationary lateral support beam 16 is effected through a rack and pinion gear means consisting of a pinion gear 54 engaging linear rack 26 secured to the top surface of upper flange 20. The rack and pinion gear means is operative through pinion gear 54 being centrally located beneath carriage 14 and engaging raised teeth 28 of rack 26. The pinion gear 54 can be rotated by an external handle 56 operatively secured to a transverse rod 58 passing through a bearing opening 60 in carriage 14 front housing wall and axially secured to circular pinion gear 54. The pinion gear rotation can be hand operated or power operated although hand controlled rotation is preferred. Rotation of pinion gear 54 causes meshing of pinion 54 with rack 26 to effect lateral movement of movable carriage 14 along rack 26 in either lateral direction as desired.

Figure 4:
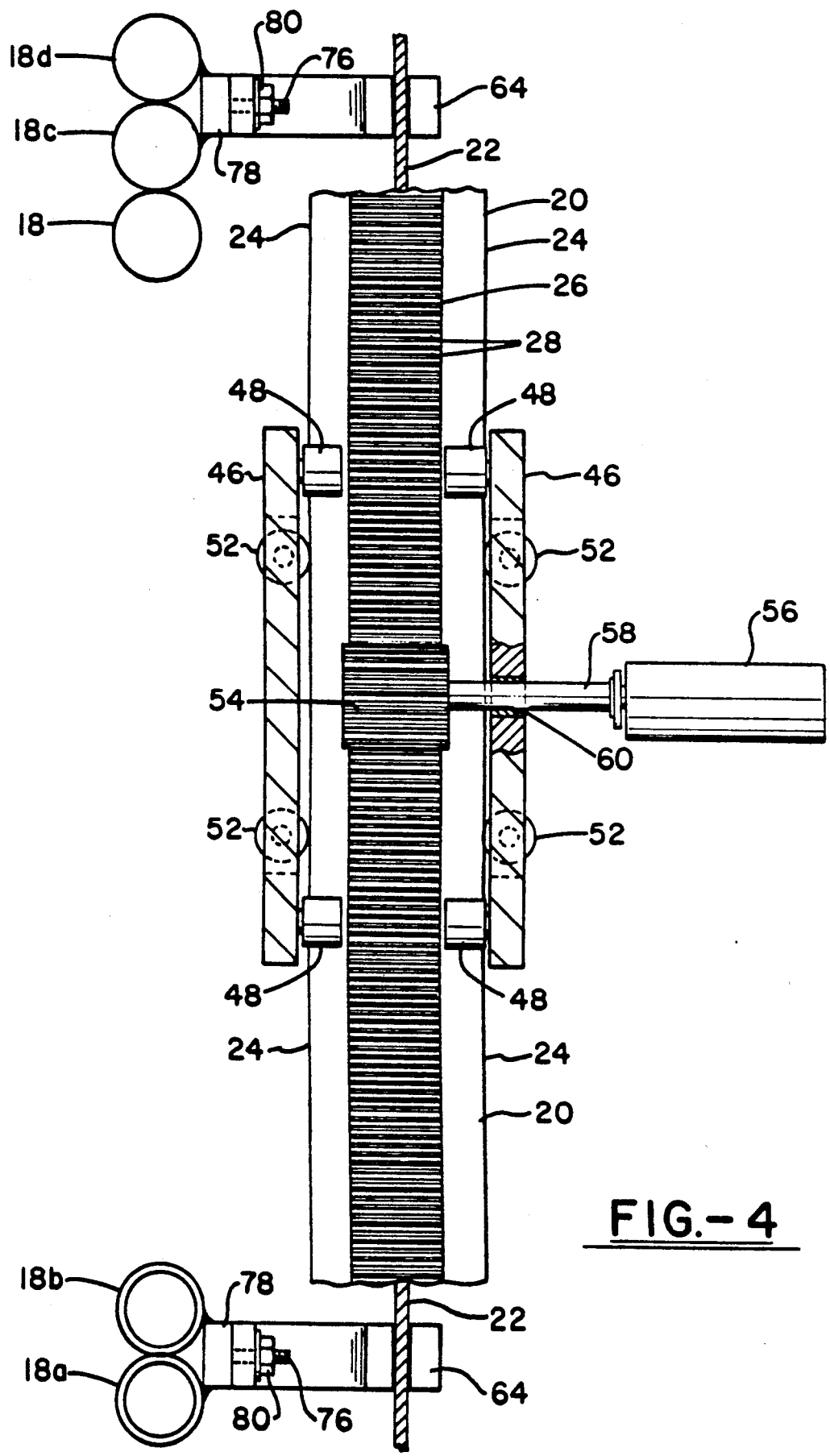
FIG. 4 is a horizontal sectional view taken along lines 4—4 in FIG. 2.

In accordance with the present invention, the movable carriage 14 and cutting means 12 must be securely stabilized as a unit relative to lateral supporting beam 16 which in turn must be securely fastened to a stable structure to obtain strain and vibration-free operation of cutting apparatus 10 so that the cutting disk rotates in a single plane. In this regard, as best viewed in FIG. 2, the lateral support beam 16 is supported by laterally spaced, heavy duty brackets generally indicated by the numeral 62 comprising an upright arm 64 for supporting the lateral support beam 16 and a longitudinal arm 66 adapted to be secured to a permanent structure. The upright arm 64 contains a deep vertical recess 68 adapted to receive and securely hold depending vertical support 22 of T-shaped lateral support beam 16. The longitudinal arm 66 is welded or otherwise secured to a vertical adjustment plate 70. Each vertical adjustment plate 70 preferably contains upper and lower adjustment slots 72 and 74 respectively where each slot comprises a vertical elongated slot adapted to receive a heavy duty adjustment bolt 76 welded to a back plate 78. The back plate 78 in turn is welded or otherwise secured to laterally spaced pairs of boiler tubes 18a, 18b, and 18c, 18d respectively, as best viewed in FIGS. 1 and 4, or to other supporting structure located adjacently to the bank of boiler tubes 18. As best viewed in FIGS. 1 and 2, the adjustment plates 70 can be adjusted vertically relative to adjustment bolts 76 extending through upper slot 72 and lower slot 74, whereupon adjustment plate 70 can be locked to back plate 78 by tightening a lock nut 80 on each adjustment bolt 76 in locking engagement with the adjustment plate 70.

In order to operate the boiler tube cutting apparatus 10 of the present invention, the lateral support beam 16 must be first secured in a lateral direction and desirably perpendicular to the axial direction of the bank of boiler tubes 18 to be cut so that each boiler tube 18 is cut at a right angle by cutting means 12. In this regard, the rectangular back plates 78 are each tack welded to a pair of laterally spaced boiler tubes identified as 18a, 18b and 18c, 18d respectively in FIG. 1. The heavy duty adjustment bolts 76 extending outwardly from back plates 78 are fitted into upper and lower slots 72, 74 of vertical adjustment plates 70. The adjustment plates 70 are securely locked with locking nuts 80 engaging adjustment plates 70 while being securely tightened on adjustment bolts 76. Ordinarily the support brackets 62 will be pre-welded to the corresponding vertical adjustment plate 70. The lateral support beam 16 is then fitted and secured with upright support brackets 62 by positioning depending vertical support 22 of support beam 16 in recess 68 disposed in the upright arm of each support bracket 62. A final adjustment can be made, if necessary, in respect to adjustment plates 70 to assure horizontal alignment of lateral support beam 16 relative to the axial direction of boiler tubes 18.

The movable carriage 14 containing pinion gear 54 is then fitted to engage lateral support beam 16. The vertically spaced upper bearing wheels 48 and lower bearing wheels 50 are fitted on the upper and lower surfaces respectively of upper flange 20 of lateral support beam 16 while the side bearings 52 are positioned to engage front and back side edges 24 of the upper flange 20. The pinion gear 54 is adjusted to mesh with rack gear 26 secured to the upper surface of flange 20, whereby movable carriage 14 is operative to move laterally forward or backward as desired by rotating hand crank 56 operatively connected to pinion gear 54. In order to commence cutting of boiler tubes 18, preferably cutting means 12 is rotated slowly from the non-operative position and against the first one or two boiler tubes 18 to create a transverse cut in the initial tubes. Once the cutting means 12 penetrates the initial boiler tubes 18, set pin 40 can be locked in place to lock cutting means 12 in a permanent cutting position for the bank of boiler tubes 18. Lateral movement of carriage 14 and cutting means 12 as a unit can be actuated by rotating hand crank 56 to move carriage 14 and thereby progressively cut through the bank of boiler tubes 18. Upon completion of the cut, the boiler tube cutting apparatus 10 can be dismantled, the tack welds between back plates 78 and supporting boiler tubes 18a, 18b and 18c, 18d can be removed and remaining boiler tubes 18a, 18b and 18c, 18d can then be cut and removed by repeating the operation at a vertically upward or lower position.

Although the present invention has been described for use in cutting vertical boiler tubes, it is readily seen that horizontal tubes or other axial directional parallel tubes other than vertical boiler tubes can be readily cut in accordance with the present invention, with the proviso that the cutting apparatus can be operated generally at any angle but preferably at an angle perpendicular to the axial direction of the parallel tubes.

Since the tube cutting apparatus of the present invention has great stability against vibration, strain, free play, slop, and the like, the cutting disk rotates essentially in a single plane. The disk is thus not subjected to rapid bending, flexing, etc. during rotation and thus has a vastly improved operation life.

While in accordance with the Patent Statutes, the best mode and preferred embodiment has been set forth, the scope of the invention is not limited thereto, but rather by the scope of the attached claims.

What is claimed is:

1. A tube cutting apparatus for continuously cutting a bank of axially aligned boiler tubes, the apparatus comprising:
    a lateral support beam disposed in a lateral direction generally perpendicular to the axial direction of the boiler tubes, said lateral support beam supported adjacently in front of the axially aligned boiler tubes, said lateral beam having an upper flange plate supporting a linear rack gear secured onto said upper flange plate in the lateral direction;
    a movable carriage supported on said lateral support beam and adapted to continuously move in a lateral direction, said movable carriage having a pinion gear engaging said rack gear secured onto said upper flange plate to provide a rack and pinion gear means and further having stabilizing means for movably and securely engaging said flange plate, and for generally stabilizing said carriage against vibration or strain in a vertical direction and in a direction transverse to said support beam;
    actuating means operatively connected to said rack and pinion gear means to cause continuous lateral movement of said movable carriage;
    cutting means supported by said movable carriage, said cutting means having a drive shaft, said drive shaft axis extending through a horizontal plane generally bounded by said stabilizing means when said cutting means is in a cutting position, said cutting means adapted to continuously cut the axially aligned boiler tubes in a plane transverse to the axis of the axially aligned boiler tubes, where said cutting means is powered by a pneumatic motor; and
    support means for securing said lateral support beam transversely adjacent in front of the bank of axially aligned boiler tubes.

2. The tube cutting apparatus of claim 1, wherein said lateral supporting beam has a T-shape cross-section.

3. The tube cutting apparatus of claim 2, wherein said T-shape beam comprises a longitudinal flange and a depending vertical member.

4. The tube cutting apparatus of claim 1, said stabilizing means including bearing means securely engaging said upper flange plate, said bearing means comprising a plurality of wheels, said flange plate having upper and lower surfaces whereby said wheels respectively engage said upper and lower surfaces of said flange plate.

5. The tube cutting apparatus of claim 4, wherein said lateral support beam has a T-shape cross-section comprising said upper flange and a depending member.

6. The tube cutting apparatus of claim 1, wherein said actuating means for activating said rack and pinion gear means comprises a hand operated handle.

7. The tube cutting apparatus of claim 1, including a cutting means where said cutting means comprises an abrasive wheel.

8. The tube cutting apparatus of claim 1, including a cutting means, wherein said cutting means is a carbide disk.

9. The tube cutting apparatus of claim 1, wherein said cutting means is pivotally adjustable so as to rotate from a non-operative position to an operative position capable of cutting said tubes.

10. The tube cutting apparatus of claim 1, wherein said cutting means is pivotally adjustable so as to rotate from a non-operative position to an operative position capable of cutting said tubes, and including a set pin to lock said pivotal cutting means into a desired rotated position with said movable carriage.

11. The tube cutting apparatus of claim 1, including support means for securing said lateral support beam transversely adjacent to said tubes, wherein said support means for securing said lateral support beam comprises a laterally spaced pair of supporting brackets each comprising an upright arm supporting said lateral support beam and a longitudinal arm for securing said supported lateral beam transversely adjacent to said tubes.

12. The tube cutting apparatus of claim 1, wherein said movable carriage stabilizing means comprises transversely spaced bearing means engaging the upper flange plate to prevent vibrations and non-planar movement of the movable carriage during cutting of the axially aligned boiler tubes, said stabilizing means further comprising side transverse stabilizing means engaging said upper flange plate to prevent transverse vibrations of said movable carriage during cutting of the axially aligned boiler tubes.

13. The tube cutting apparatus of claim 12, wherein the upper flange plate has an upper surface and a lower surface, and said transversely spaced bearing means comprises a plurality of wheels engaging the upper and lower surfaces of the flange plate.

14. The tube cutting apparatus of claim 13, wherein the upper flange plate includes a front side lateral edge and a back side lateral edge, and said transverse stabilizing means comprises a first side bearing means engaging said front lateral side edge and a second side bearing means engaging said back side lateral edge.

15. The tube cutting apparatus of claim 1, wherein the axis of the axially aligned boiler tubes is substantially vertical and the lateral support beam is disposed in substantially a horizontal direction.

16. The tube cutting apparatus of claim 15, said stabilizing means including transversely spaced bearing means for engaging the upper flange plate to prevent vertical vibrations of the movable carriage.

17. A tube cutting apparatus for continuously cutting essentially vertical parallel tubes, comprising:
a movable carriage containing a cutting means capable of cutting the tubes, said carriage having a pinion gear and said cutting means having a drive shaft; and
a lateral support beam disposed in a lateral direction generally perpendicular to the axial direction of the tubes, said lateral support beam having an upper surface and capable of being securely mounted adjacent to the tubes and further having a rack gear on said upper surface, said carriage having stabilizing means for movably and securely engaging said lateral support beam and said carriage pinion gear rotatably engaging said rack gear whereby said carriage cutting means is capable of continuous lateral movement on said lateral support beam, and said cutting means being supported by said 'movable carriage so that said drive shaft axis extends through a horizontal plane generally bounded by said stabilizing means when said cutting means is in a cutting position, said cutting means adapted to continuously cut the axially aligned boiler tubes in a plane substantially transverse to the axis of the axially aligned boiler tubes.

18. A tube cutting apparatus according to claim 17, wherein said lateral support beam has an upper flange plate support and said stabilizing means engages the upper and lower surfaces of said upper flange plate support.

19. A tube cutting apparatus according to claim 18, wherein said upper flange plate support has lateral edges and said stabilizing means engages said lateral edges.

20. A tube cutting apparatus according to claim 19, wherein said movable carriage means contains a pneumatic motor, said pneumatic motor operatively connected to said cutting means.

21. A tube cutting apparatus according to claim 20, including support means for securing said lateral support beam transversely adjacent to said tubes, wherein said support means for securing said lateral support beam comprises laterally spaced supporting brackets each comprising an upright arm supporting said lateral support beam and a longitudinal arm for securing said supported lateral beam transversely adjacent to the bank of boiler tubes.

22. A tube cutting apparatus according to claim 21, wherein each said upright arm has a vertical recess, and said lateral support beam comprises a T-shape cross-section having a downwardly depending vertical member securely engaged within said recess of each said upright arm.

23. A tube cutting apparatus according to claim 22, wherein each said longitudinal arm is welded to an adjustment plate adapted to adjust in the axial direction of said tubes.

24. A tube cutting apparatus for continuously cutting essentially parallel tubes, comprising:
a movable carriage containing a pneumatic motor and a cutting means capable of cutting the tubes, said pneumatic motor being operatively connected to said cutting means and said carriage having a pinion gear;
a lateral support beam including an upper flange plate support having lateral edges, said lateral support beam being disposed in a lateral direction generally perpendicular to the axial direction of the tubes, said lateral support beam having a rack gear thereon; and
support means for securely mounting said lateral support beam transversely adjacent to said tubes, wherein said support means for securing said lateral support beam comprises laterally spaced supporting brackets each comprising an upright arm having a vertical recess for supporting said lateral support beam and a longitudinal arm for securing said supported lateral beam transversely adjacent to the bank boiler tubes, said lateral support beam comprising a T-shaped cross-section having a downwardly depending vertical member securely engaged within said recess of each of said upright arms, said carriage having stabilizing means for movably and securely engaging the upper and lower surfaces and lateral edges of said upper flange plate support, and said carriage pinion gear rotatably engaging said rack gear whereby said carriage cutting means is capable of continuous lateral movement on said lateral support beam, said cutting means being supported by said movable carriage adapted to to continuously cut the axially aligned boiler tubes in a plane substantially transverse to the axis of said tubes.

25. A tube cutting apparatus according to claim 24, wherein each of said longitudinal arms is welded to an adjustment plate adapted to adjust in the axial direction of said tubes.

26. A tube cutting apparatus for cutting essentially parallel tubes, comprising:
a movable carriage containing a pneumatic motor and a cutting means capable of cutting the tubes, said pneumatic motor being operatively connected to said cutting means and said carriage having a pinion gear; and
a lateral support beam including an upper flange plate support having lateral edges, said lateral support beam being disposed in a lateral direction perpendicular to the axial direction of the tubes; and
support means for securely mounting said lateral support beam transversely adjacent to said tubes, wherein said support means for securing said lateral support beam comprises laterally spaced supporting brackets each comprising an upright arm having a vertical recess, said lateral support beam comprising a T-shaped cross-section having a downwardly depending vertical member securely engaged within said recess of each of said upright arms whereby said lateral support beam is supported, and a longitudinal arm for securing said supported lateral beam transversely adjacent to the bank of boiler tubes, said lateral support beam having a rack gear thereon, said carriage movably supported on said lateral support beam and adapted to progressively move in a lateral direction, said carriage having stabilizing means for securely engaging the upper and lower surfaces and the lateral edges of said upper flange plate support, said cutting means being supported by said movable carriage, said cutting means adapted to progressively cut the axially aligned boiler tubes in a plane substantially transverse to the axis of the axially aligned boiler tubes, and said carriage pinion gear rotatably engaging said rack gear whereby said carriage cutting means is capable of lateral movement on said lateral support beam.

27. A tube cutting apparatus according to claim 26, wherein each of said longitudinal arms is welded to an adjustment plate adapted to adjust in the axial direction of said tubes.

28. A tube cutting apparatus for cutting vertical boiler tubes aligned as a bank of boiler tubes in a lateral direction, the cutting apparatus adapted to cut the boiler tubes transversely to the axial direction of the aligned boiler tubes, the apparatus comprising:
a lateral support beam horizontally disposed and adapted to be supported adjacently in front of the bank of boiler tubes, said lateral beam having an upper flange plate with a linear rack gear secured to an upper surface of said upper flange plate in the lateral direction, said upper flange plate having a front side lateral edge and a back side lateral edge;
a movable carriage adapted to move in a lateral direction and supported on said lateral support beam, said carriage including a plurality of vertically spaced bearing means securely engaging said upper flange plate to prevent non planar rotation and vertical vibrations of said movable carriage during cutting of the boiler tubes, said carriage having a first side bearing means engaging the front side lateral edge of said upper flange plate and a second side bearing means engaging said back side lateral edge of said upper flange plate to prevent transverse vibrations of said carriage during cutting of the boiler tubes, said carriage having a pinion gear engaging said rack gear secured to said upper flange plate to provide a rack and pinion gear means;
actuating means for operating said rack and pinion gear means to cause lateral movement of said carriage on the lateral supporting beam;
cutting means supported on said movable carriage and adapted to cut a plurality of the boiler tubes transversely to the axis of the aligned boiler tubes, said cutting means having a drive shaft powered by a pneumatic motor, said drive shaft axis extending through a horizontal plane generally bounded by said plurality of vertically spaced bearing means and said first and second side bearing means when said cutting means is cutting said tubes; and
support means for securing said lateral support beam horizontally adjacent to the bank of boiler tubes.

29. A tube cutting apparatus for continuously cutting essentially parallel tubes, comprising:
a movable carriage containing a cutting means capable of cutting the tubes, said carriage having a pinion gear and said cutting means having a drive shaft; and
a lateral support beam disposed in a lateral direction generally perpendicular to the axial direction of the tubes, said lateral support beam capable of being securely mounted adjacent to the tubes and having a rack gear thereon, said carriage having stabilizing means for movably and securely engaging said lateral support beam and said carriage pinion gear rotatably engaging said rack gear whereby said carriage cutting means is capable of continuous lateral movement on said lateral support beam, said stabilizing means further generally stabilizing said carriage in a vertical direction and in a direction transverse to said support beam, said cutting means being supported on said movable carriage so that said drive shaft axis extends through a horizontal plane generally bounded by said stabilizing means when said cutting means is in a cutting position, said cutting means adapted to continuously cut a plurality of tubes generally perpendicular to the axial direction of the tubes.

30. A tube cutting apparatus according to claim 29, wherein said lateral support beam has an upper flange plate support, said stabilizing means engaging the upper and lower surfaces of said upper flange plate support.

31. A tube cutting apparatus according to claim 30, wherein said upper flange plate support has lateral edges and said stabilizing means engage said lateral edges.

32. A tube cutting apparatus according to claim 31, wherein said movable carriage means contains a pneumatic motor, said pneumatic motor operatively connected to said cutting means.

33. A tube cutting apparatus according to claim 32, including support means for securing said lateral support beam transversely adjacent to said tubes, wherein said support means for securing said lateral support beam comprises laterally spaced supporting brackets each comprising an upright arm supporting said lateral support beam and a longitudinal arm for securing said supported lateral beam transversely adjacent to the bank of boiler tubes.

34. A tube cutting apparatus for cutting essentially parallel tubes, comprising:

a movable carriage containing a cutting means capable of cutting the tubes, said carriage having a pinion gear;

a lateral support beam capable of being mounted adjacent to the tubes and having a rack gear thereon, said carriage movably and securely engaging said lateral support beam, and said carriage pinion gear rotatably engaging said rack gear whereby said carriage cutting means is capable of lateral movement on said lateral support beam;

wherein said lateral support beam has an upper flange plate support, said movable carriage having stabilizing means, said stabilizing means engaging the upper and lower surfaces of said upper flange plate support;

wherein said upper flange plate support has lateral edges, said movable carriage having stabilizing means for engaging each said lateral edge;

wherein said movable carriage means contains a pneumatic motor, said pneumatic motor operatively connected to said cutting means;

support means for securing said lateral support beam transversely adjacent to said tubes, wherein said support means for securing said lateral support beam comprises laterally spaced supporting brackets each comprising an upright arm supporting said lateral support beam and a longitudinal arm for securing said supported lateral beam transversely adjacent to the bank of boiler tubes; and wherein each said upright arm has a vertical recess, and said lateral support beam comprises a T-shape cross-section having a downwardly depending vertical member securely engaged within said recess of each said upright arm.

35. A tube cutting apparatus according to claim 34, wherein each said longitudinal arm is welded to an adjustment plate adapted to adjust in the axial direction of said tubes.

36. A tube cutting apparatus for cutting parallel boiler tubes, comprising:

a lateral support beam extending in a lateral direction and adapted to be supported transversely adjacent to the boiler tubes, said lateral beam having an upper flange plate and a rack gear secured to said upper flange plate in a lateral direction, said rack gear having raised gear teeth;

a movable carriage supported on said lateral beam and securely engaging said upper flange plate to enable lateral movement of said carriage on said upper flange plate, said carriage having a pinion gear engaging said rack gear on the upper flange plate of the lateral beam to provide a rack and pinion gear means; and actuating means for activating said rack and pinion gear means to cause lateral movement of said carriage on said lateral support beam;

a power activated cutting means, wherein said power actuated cutting means is a pneumatic motor;

support means for securing said lateral support beam transversely adjacent to said tubes, wherein said support means for securing said lateral support beam comprises a laterally spaced pair of supporting brackets each comprising an upright arm supporting said lateral support beam and a longitudinal arm for securing said supported lateral beam transversely adjacent to said tubes; and wherein each said supporting bracket has an upright arm containing a vertical recess, and said support lateral beam comprises a T-shape cross-section having a downwardly depending vertical member securely engaged within each recess of each said upright arm.

37. The tube cutting apparatus of claim 36, wherein each said longitudinal arm of said supporting bracket is welded to an adjustment plate adapted to adjust in the axial direction of said tubes.

38. The tube cutting apparatus of claim 37, wherein each said adjustment plate contains at least one adjustment slot engaging a protruding bolt means secured to a back plate securing the cutting apparatus adjacent to tubes, and where a nut means secured to the bolt means maintains said adjustment plate locked to said back plate.

39. A tube cutting apparatus for cutting parallel boiler tubes, comprising:

a lateral support beam extending in a lateral direction and adapted to be supported transversely adjacent to the boiler tubes, said lateral beam having an upper flange plate and a rack gear secured to said upper flange plate in a lateral direction, said rack gear having raised gear teeth;

a movable carriage supported on said lateral beam and securely engaging said upper flange plate to enable lateral movement of said carriage on said upper flange plate, said carriage having a pinion gear engaging said rack gear on the upper flange plate of the lateral beam to provide a rack and pinion gear means; and actuating means for activating said rack and pinion gear means to cause lateral movement of said carriage on said lateral support beam;

said carriage having bearing means securely engaging said upper flange plate, said bearing means comprising a plurality of wheels, said flange plate having upper and lower surfaces whereby said wheels respectively engage said upper and lower surfaces of said flange plate;

wherein said lateral support beam has a T-shape cross-section comprising said upper flange and a depending member;

wherein said upper flange plate of said supporting lateral beam has lateral edges on both sides of said upper flange plate, and said movable carriage including side stabilizing means for engaging each said lateral edge;

wherein each said side stabilizing means comprises side bearings engaging each said lateral edge;

a power activated cutting means, wherein said power actuated cutting means is powered by pneumatic means;

wherein said cutting means is pivotally adjustable so as to rotate from a non-operative position to an operative position capable of cutting said tubes, and including a set pin to lock said pivotal cutting means into a desired rotated position with said movable carriage;

support means for securing said lateral support beam transversely adjacent to said tubes, wherein said support means for securing said lateral support beam comprises a laterally spaced pair of supporting brackets each comprising an upright arm supporting said lateral support beam and a longitudinal arm for securing said supported lateral beam transversely adjacent to said tubes; and wherein each said supporting bracket has an upright arm containing a vertical recess, and said support lateral beam comprises a T-shape cross-section having a downwardly depending vertical member securely engaged within each recess of each said upright arm.

40. The tube cutting apparatus of claim 39, wherein each said longitudinal arm of said supporting bracket is welded to an adjustment plate adapted to adjust in the axial direction of said tubes.

41. The tube cutting apparatus of claim 40, wherein each said adjustment plate contains at least one adjustment slot engaging a protruding bolt means secured to a back plate securing the cutting apparatus adjacent to tubes, and where a nut means secured to the bolt means maintains said adjustment plate locked to said back plate.

42. A tube cutting apparatus for cutting essentially parallel tubes, comprising:
a movable carriage containing a cutting means capable of cutting the tubes, said carriage having a pinion gear and said cutting means having a drive shaft; and
a lateral support beam including an upper flange plate support having lateral edges, said beam being disposed in a lateral direction generally perpendicular to the axial direction of the tubes, said lateral support beam capable of being securely mounted adjacent to the tubes and having a rack gear on said upper flange plate support, said carriage having stabilizing means for movably and securely engaging said flange plate support and said lateral edges, said carriage pinion gear rotatably engaging said rack gear whereby said carriage cutting means is capable of lateral movement on said lateral support beam, said cutting means being supported on said movable carriage so that said drive shaft axis extends through a horizontal plane generally bounded by said stabilizing means when said cutting means is in a cutting position, said cutting means adapted to cut a plurality of tubes generally perpendicular to the axial direction of the tubes.

43. A tube cutting apparatus according to claim 42, wherein said movable carriage means contains a pneumatic motor, said pneumatic motor operatively connected to said cutting means.

44. A tube cutting apparatus according to claim 43, including support means for securing said lateral support beam transversely adjacent to said tubes, wherein said support means for securing said lateral support beam comprises laterally spaced supporting brackets each comprising an upright arm supporting said lateral support beam and a longitudinal arm for securing said supported lateral beam transversely adjacent to the bank of boiler tubes.

45. A tube cutting apparatus for progressively cutting a bank of axially aligned boiler tubes, the apparatus comprising:
a lateral support beam disposed in a lateral direction generally perpendicular to the axial direction of the boiler tubes, said lateral support beam supported adjacently in front of the axially aligned boiler tubes, said lateral beam having an upper flange plate supporting a linear rack gear secured onto said upper flange plate in the lateral direction;
a moveable carriage supported on said lateral support beam and adapted to progressively move in a lateral direction, said moveable carriage having a pinion gear engaging said rack gear secured onto said upper flange plate to provide a rack and pinion gear means, said moveable carriage further having stabilizing means comprising transversely spaced bearing means engaging the upper flange plate to prevent vibrations and non-planar movement of the moveable carriage during cutting of the axially aligned boiler tubes, said moveable carriage further having side transverse stabilizing means engaging said upper flange plate to prevent transverse vibrations of said moveable carriage during cutting of the axially aligned boiler tubes;
actuating means operatively connected to said rack and pinion gear means to cause progressive lateral movement of said moveable carriage;
cutting means supported by said moveable carriage, said cutting means having a drive shaft, said drive shaft axis extending through a horizontal plane generally bounded by said transversely spaced bearing means and said side transverse stabilizing means when said cutting means is in a cutting position, said cutting means adapted to progressively and continuously cut the axially aligned boiler tubes in a plane transverse to the axis of the axially aligned boiler tubes, wherein said cutting means is powered by a pneumatic motor; and
support means for securing said lateral support beam transversely adjacent in front of the bank of axially aligned boiler tubes.

46. The tube cutting apparatus of claim 45, wherein the upper flange plate has an upper surface and a lower surface, and said transversely spaced bearing means comprises a plurality of wheels engaging the upper and lower surfaces of the flange plate.

47. The tube cutting apparatus of claim 46, wherein the upper flange plate includes a front side lateral edge and a back side lateral edge, and said transverse stabilizing means comprises a first side bearing means engaging said front lateral side edge and a second side bearing means engaging said back side lateral edge.

48. A tube cutting apparatus for cutting essentially vertical parallel tubes, comprising:
a movable carriage containing a cutting means capable of cutting the tubes, said carriage having a pinion gear and said cutting means having a drive shaft; and
a lateral support beam including an upper flange plate support having an upper surface and lateral edges, said lateral support beam being disposed in a lateral direction perpendicular to the axial direction of the tubes, said lateral support beam capable of being mounted adjacent to the tubes and having a rack gear on said upper surface of said upper flange plate support, said carriage movably supported on said lateral support beam and adapted to progressively move in a lateral direction, said carriage having stabilizing means for securely engaging the upper and lower surfaces and the lateral edges of said upper flange plate support, said cutting means being supported by said movable carriage so that said drive shaft axis extends through a horizontal plane generally bounded by said stabilizing means when said cutting means is in a cutting position, said cutting means adapted to progressively cut the axially aligned boiler tubes in a plane substantially transverse to the axis of the axially aligned boiler tubes, and said carriage pinion gear rotatably engaging said rack gear whereby said carriage cutting means is capable of lateral movement on said lateral support beam.

49. A tube cutting apparatus according to claim 48, wherein said movable carriage means contains a pneumatic motor, said pneumatic motor operatively connected to said cutting means.

50. A tube cutting apparatus according to claim 49, including support means for securing said lateral support beam transversely adjacent to said tubes, wherein said support means for securing said lateral support beam comprises laterally spaced supporting brackets each comprising an upright arm supporting said lateral support beam and a longitudinal arm for securing said supported lateral beam transversely adjacent to the bank of boiler tubes.

51. A tube cutting apparatus according to claim 50, wherein each said upright arm has a vertical recess, and said lateral support beam comprises a T-shape cross-section having a downwardly depending vertical member securely engaged within said recess of each said upright arm.

52. A tube cutting apparatus according to claim 51, wherein each said longitudinal arm is welded to an adjustment plate adapted to adjust in the axial direction of said tubes.

* * * * *